United States Patent
Zhang et al.

(10) Patent No.: US 9,601,982 B1
(45) Date of Patent: Mar. 21, 2017

(54) SWITCHABLE AUXILIARY SUPPLY CIRCUIT

(71) Applicant: Flextronics AP, LLC, Broomfield, CO (US)

(72) Inventors: Martin Zhang, ShenZhen (CN); Wei Li, Nanshan (CN); Anthony Brinlee, Plano, TX (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 14/470,771

(22) Filed: Aug. 27, 2014

Related U.S. Application Data (60) Provisional application No. 61/870,756, filed on Aug. 27, 2013, provisional application No. 61/878,515, filed on Sep. 16, 2013.

(51) Int. Cl.
*H02M 3/24* (2006.01)
*H02M 1/08* (2006.01)
*H02M 7/04* (2006.01)

(52) U.S. Cl.
CPC .............. *H02M 1/08* (2013.01); *H02M 3/24* (2013.01); *H02M 7/04* (2013.01)

(58) Field of Classification Search
CPC .......... H02M 7/00; H02M 7/02; H02M 7/043; H02M 7/12; H02M 7/155; H02M 7/1555; H02M 7/162; H02M 7/1623; H02M 7/66; H02M 7/68; H02M 2001/0003; H02M 1/08; H02M 3/24
USPC ......... 363/21.12, 21.13, 21.14, 21.15, 21.16, 363/21.17, 21.18
See application file for complete search history.

(56) References Cited

U.S. PATENT DOCUMENTS

| | | | |
|---|---|---|---|
| 4,837,495 A | 6/1989 | Zansky | |
| 5,838,556 A * | 11/1998 | Yokoyama | H02M 3/3385 363/19 |
| 5,903,452 A | 5/1999 | Yang | |
| 7,443,700 B2 | 10/2008 | Yan | |
| 7,570,037 B2 | 8/2009 | Li | |
| 8,059,429 B2 | 11/2011 | Huynh | |
| 8,159,843 B2 | 4/2012 | Lund et al. | |
| 8,987,999 B2 * | 3/2015 | Zhang | H05B 33/0815 315/119 |
| 2002/0121882 A1 | 9/2002 | Matsuo | |
| 2003/0128018 A1 | 7/2003 | Telefus et al. | |
| 2005/0218942 A1 | 10/2005 | Yamashita | |
| 2008/0130325 A1 | 6/2008 | Ye | |
| 2009/0268487 A1 | 10/2009 | Park | |
| 2010/0002480 A1 | 1/2010 | Huynh | |

(Continued)

OTHER PUBLICATIONS

Notice of Allowance, U.S. Appl. No. 14/452,443, filing date: Aug. 5, 2014, Mark Telefus, Art Unit: 2838, 45 pages.

(Continued)

*Primary Examiner* — Timothy J Dole
*Assistant Examiner* — Shahzeb K Ahmad
(74) *Attorney, Agent, or Firm* — Haverstock & Owens LLP (57) ABSTRACT

A method of and device for reducing power loss in a voltage conversion circuit. The voltage conversion circuit comprises a main power circuit and a switchable auxiliary circuit, which comprises a first and a second winding circuits. A switch controls the use of the first winding circuit, the second winding circuit, or both to reduce power lose during the voltage conversion.

17 Claims, 10 Drawing Sheets

(56) References Cited

U.S. PATENT DOCUMENTS

| | | |
|---|---|---|
| 2010/0008109 A1 | 1/2010 | Morota |
| 2012/0002451 A1 | 1/2012 | Djenguerian et al. |
| 2012/0069609 A1 | 3/2012 | Christophe et al. |
| 2012/0176820 A1 | 7/2012 | Li et al. |
| 2013/0033905 A1 | 2/2013 | Lin et al. |
| 2013/0155728 A1* | 6/2013 | Melanson ............... H02M 1/44 363/21.16 |
| 2013/0194836 A1 | 8/2013 | Morris et al. |
| 2013/0215649 A1 | 8/2013 | Huang et al. |
| 2013/0250629 A1 | 9/2013 | Xu |
| 2013/0329469 A1* | 12/2013 | Kubota ............. H02M 3/33507 363/21.16 |
| 2014/0268912 A1 | 9/2014 | Telefus |

OTHER PUBLICATIONS

Non-Final Office Action mailed Jul. 12, 2016, U.S. Appl. No 13/924,402, filed Jun. 21, 2013, Art Unit: 2838, 12 pages.
Non-Final Office Action mailed Jul. 21, 2016, U.S. Appl. No. 13/924,388, filed Jun. 21, 2013, Art Unit; 2838, 16 pages.

\* cited by examiner

SWITCHABLE AUXILIARY SUPPLY CIRCUIT

CROSS-REFERENCE TO RELATED APPLICATION(S)

This application claims priority under 35 U.S.C. §119(e) of the U.S. Provisional Patent Application Ser. No. 61/870,756, filed Aug. 27, 2013, titled "SINGLE OUTPUT CHANNEL ADAPTER FOR CHARGING DURING LAPTOP SLEEP MODE" and the U.S. Provisional Patent Application Ser. No. 61/878,515, filed Sep. 16, 2013, titled, "A SWITCHABLE AUXILIARY SUPPLY CIRCUIT," which are hereby incorporated by reference in their entirety for all purposes.

FIELD OF THE INVENTION

The present invention relates to the field of power supply. More specifically, the present invention relates to power supplies with a voltage transformation.

BACKGROUND OF THE INVENTION

Adaptors with switchable output voltages (such as 5V and 14.75V) are used to recharge different electronic devices, such as a smart phone and a laptop. Typically, a flyback converter is used. The difference of the output voltages is big between a high voltage mode and a low voltage mode, which results in a big difference in a conversion voltage at an auxiliary winding.

Figure 1:
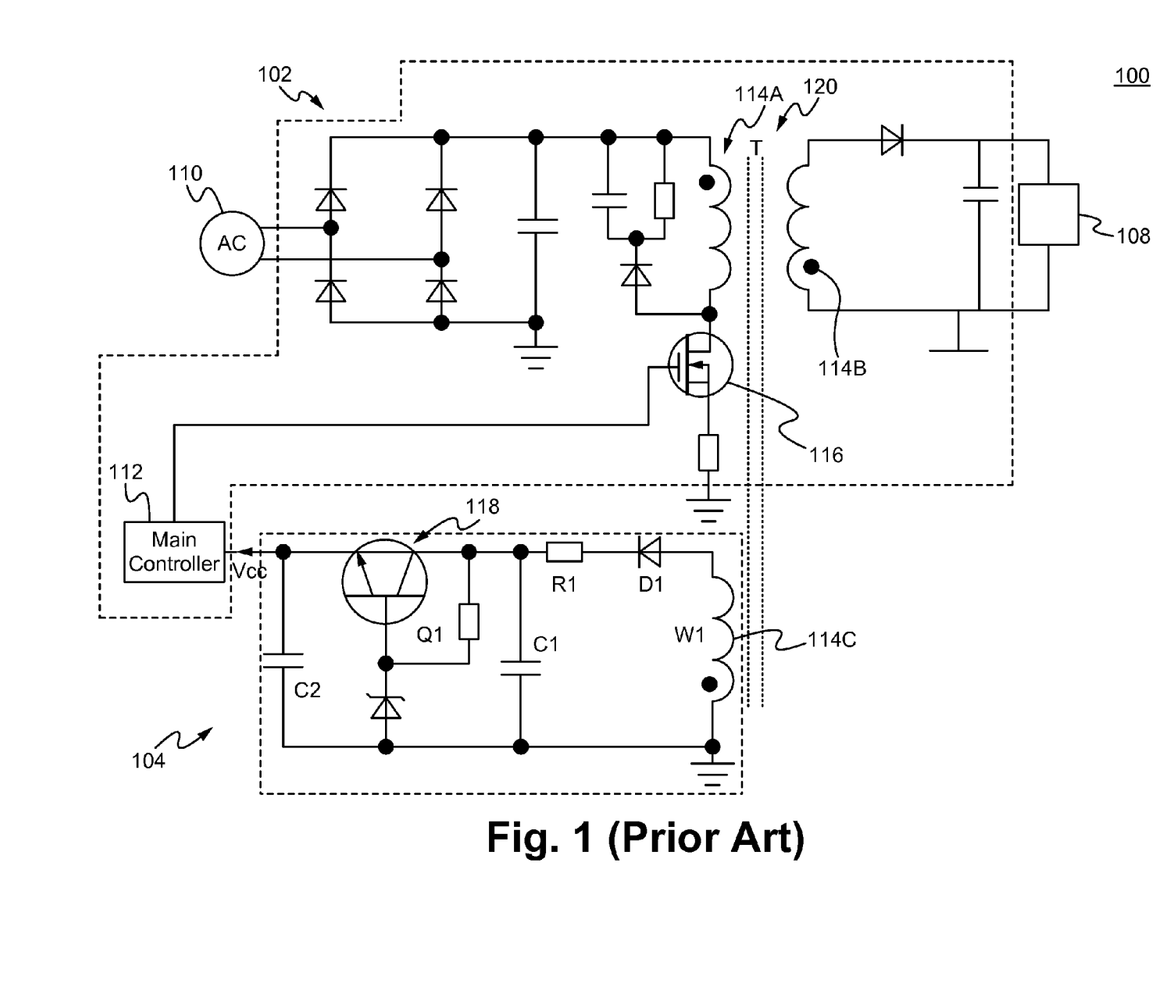
FIG. 1 illustrates a conventional supply circuit, which uses an auxiliary winding and a transistor to form a pre-regulated supply circuit.

FIG. 1 illustrates a conventional supply circuit 100, which uses an auxiliary winding W1 114C and a transistor switch Q1 118 within an auxiliary circuit 104 to form a pre-regulated supply circuit for the main controller 112. Specifically, the conventional supply circuit 100 comprises two sub-circuits including the flyback converter 102 for powering the load 108 and the auxiliary supply circuit 104 for powering the controller 112. The AC power source 110 electrically couples with the flyback converter 102 to provide power to the converter. The flyback converter 102 comprises a transformer T having a primary winding 114A electrically coupled with a switch 116 and a secondary winding 114B coupled to the load 108. The switch 116 is electrically coupled with the main controller 112 such that the main controller 112 is able to control the switching of the switch 116. Further, the auxiliary circuit 104 is electrically coupled with the auxiliary supply circuit 104 via the auxiliary winding 114C of the transformer T 120.

Generally, the voltage on the auxiliary winding 114C is proportional to the output voltage of flyback converter to the load 108. As a result, in a high voltage mode (such as 14.75V), the voltage on the auxiliary winding 114C will be very high, which results in a high voltage difference between the voltage Vcc and the voltage on the switch Q1. This high voltage difference between Vcc and Q1 results in the high losses in the switch Q1 during operation due to the constant sink current from main controller 112, which generally requires a low voltage to be powered properly (such as 5V).

SUMMARY OF THE INVENTION

A method of and device for reducing power loss in a voltage conversion circuit are provided. In some embodiments, the voltage conversion circuit comprises a switchable auxiliary supply circuit with two auxiliary windings. Some exemplary embodiments are disclosed in the following.

In an aspect, an electrical converter comprises a main power circuit, a switchable auxiliary circuit comprising an auxiliary control circuit controlling a state of a switch, wherein the state of the switch determines an involvement of a portion of the switchable auxiliary circuit, and a main controller electrically electrically couples with the switchable auxiliary circuit and the main power circuit. In some embodiments, the switchable auxiliary circuit comprises a first winding circuit and a second winding circuit. In other embodiments, the state of the switch comprises ON or OFF. In some other embodiments, the state of the switch determines using the first winding circuit or both the first and the second winding circuit. In some embodiments, the auxiliary control circuit is powered by a capacitor on the first winding circuit and a voltage mode determining mechanism on the first winding circuit. In other embodiments, the auxiliary control circuit is powered by a capacitor on the second winding circuit and a voltage mode determining mechanism on the second winding circuit. In some other embodiments, the auxiliary control circuit is powered by a capacitor on the second winding circuit and a voltage mode determining mechanism on the first winding circuit. In some embodiments, the auxiliary control circuit is powered by a capacitor on the first winding circuit and a voltage mode determining mechanism on the second winding circuit. In some other embodiments, the auxiliary control circuit comprises a voltage mode determining mechanism having at least two resistors.

In another aspect, an auxiliary circuit comprises a first winding circuit, a second winding circuit, and an auxiliary control circuit coupling with a switch determining a use of the first winding circuit, the second winding circuit, or both based on a determined voltage state from a main power circuit. In some embodiments, the auxiliary circuit electrically couples with a main controller. In other embodiments, the main controller controls a switch on the main power circuit. In some other embodiments, the auxiliary control circuit is powered by a capacitor on the first winding circuit and wherein the voltage state is determined by the first winding circuit. In some embodiments, the auxiliary control circuit is powered by a capacitor on the second winding circuit and wherein the voltage state is determined by the second winding circuit. In some other embodiments, the auxiliary control circuit is powered by a capacitor on the first winding circuit and wherein the voltage state is determined by the second winding circuit. In some embodiments, the auxiliary control circuit is powered by a capacitor on the second winding circuit and wherein the voltage state is determined by the first winding circuit. In other embodiments, the auxiliary circuit comprises a voltage state determining mechanism.

In another aspect, a method of reducing power loss in a voltage conversion circuit comprises receiving a voltage on a main power circuit, generating a voltage state on a switchable auxiliary circuit via the main power circuit, and determining the voltage state on the switchable auxiliary circuit to open or close a switch on the switchable auxiliary circuit, such that a power loss of a voltage conversion is reduced. In some embodiments, the switchable auxiliary circuit comprises an auxiliary control circuit coupling with the switch. In other embodiments, the switchable auxiliary circuit electrically couples with a main controller coupling with a switch on the main power circuit.

Other features and advantages of the present invention will become apparent after reviewing the detailed description of the embodiments set forth below.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

DETAILED DESCRIPTION OF THE PREFERRED EMBODIMENT

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure.

Figure 2:
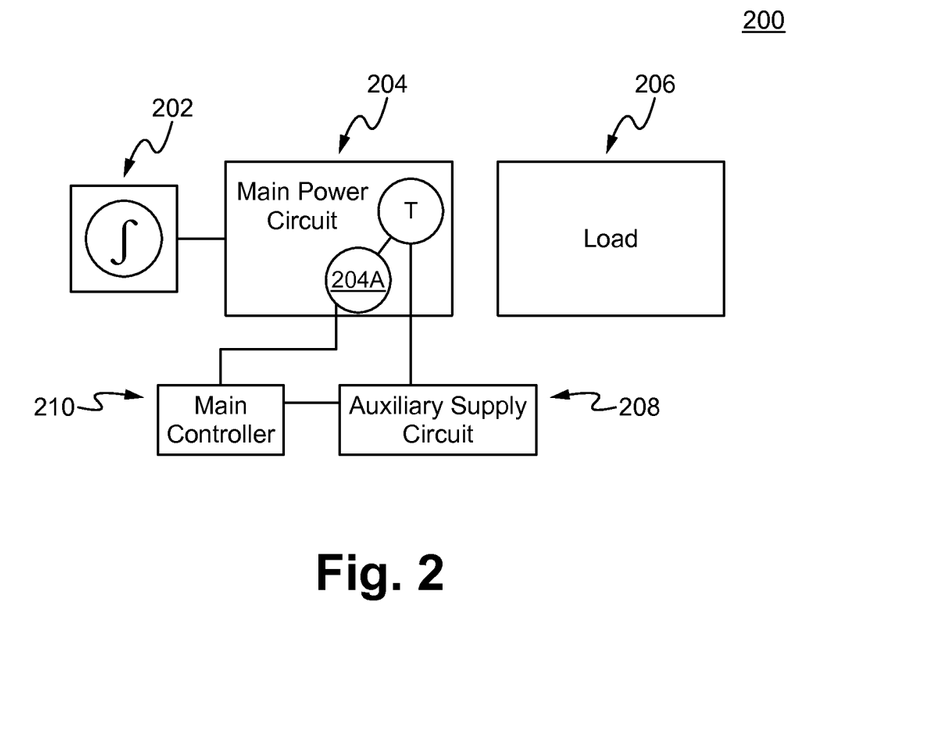
FIG. 2 illustrates a voltage converter in accordance with some embodiments of the present invention.

FIG. 2 illustrates a multiple mode power converter 200 in accordance with some embodiments of the present invention. The converter 200 can comprise a power source 202, such as a AC power source. Alternatively, the power source is able to be a DC power source. The power source 202 electrically couples with a main power circuit 204 to provide power to the main power circuit 204. In some embodiments, the main power circuit 204 comprises a flyback converter. Alternatively, the main power circuit is able to comprise other types of power converter circuits (e.g. buck, boost, buck-boost) as are well known in the art. In the case where the main power circuit 204 is a flyback converter, the circuit 204 is able to be the same or substantial similar circuit connections or layout like the main power circuit 102 of FIG. 1. The load 206 is able to comprise an electrical device or devices such as a laptop, a smart phone or other types of electronic devices. The main power circuit 204 can electrically, magnetically, physically, detachably or a combination thereof couple with the load 206. A main controller 210 can electrically couple with switch 204 of the main power circuit for controlling the switching of the switch 204 and therefore the power supply from the circuit 204 to the load 206. The main controller 210 can electrically couple with the auxiliary supply circuit 208 in order to receive a power supply voltage Vcc from the auxiliary supply circuit 208. Further, the auxiliary supply circuit 208 electrically couples with the transformer T of the power circuit 204 via one or more auxiliary windings (W1, W2) of the transformer T in order to derive power from the main power circuit 204. In some embodiments, the windings of the auxiliary circuit 208 are primary windings. Alternatively, the windings are able to be secondary windings.

In the following discussion, at least four exemplary switchable auxiliary supply circuits types (such as Type I~IV) are provided in accordance with some embodiments of the present invention. The auxiliary supply circuits can be part or entire portion of the auxiliary supply circuit 208 of FIG. 2.

Figure 3:
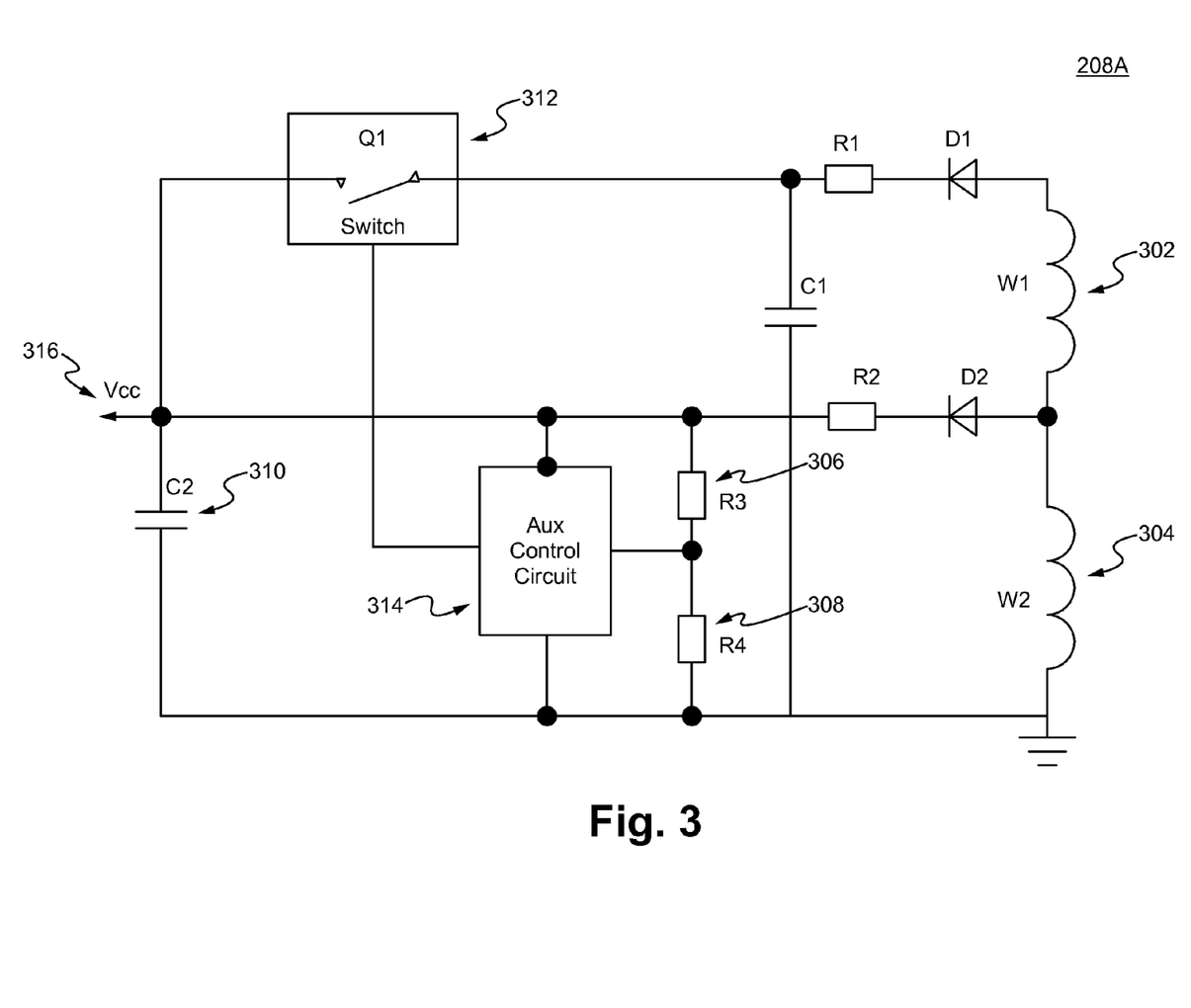
FIG. 3 illustrates a type I switchable auxiliary supply circuits 208A in accordance with some embodiments of the present invention.

FIG. 3 illustrates a type I switchable auxiliary supply circuit 208A in accordance with some embodiments of the present invention. The type I switchable auxiliary supply circuit comprises an auxiliary control circuit that is powered by a capacitor C2 310 and comprises a voltage sensing member sensing the voltage on C2 310. As shown in FIG. 3, the type I switchable auxiliary supply circuit 208A derives power and senses a voltage from the transformer T from a node between the first winding W1 302 and the second winding W2 304.

The circuit 208A comprises two auxiliary windings W1 302 and W2 304 of the transformer T of the main power circuit 204 as described above. The auxiliary supply circuit 208A senses the voltage on the capacitor C2 310 via the resistors R3 306 and R4 308 as shown in FIG. 3. Alternatively, one or more of the resistors R3 306 and R4 308 are able to be omitted and/or additional resistors are able to be added. As a result, when the circuit 208A senses that the voltage on C2 is above a predetermined voltage (such as 7V), the circuit 208A causes a switch Q1 312 to be OFF (opened), so that the Vcc 316 (circuit output to a main controller (such as main controller 210)) is only powered by the energy on the winding W2 304. In contrast, when it is sensed that the voltage on C2 is below the predetermined voltage, the circuit 208A causes the switch Q1 312 to be ON (closed) such that the Vcc 316 to the main controller 210

(FIG. 2) is powered by both windings (W1 302 and W2 304). Thus, when the converter circuit 200 is in a high voltage mode (e.g. to power a laptop) such that the output to the load 206 is a high voltage (e.g. 14.75V), the voltage on the transformer T and thus the auxiliary windings W1 302 and W2 304 will be high and the switch Q1 312 will be opened such that only the smaller energy on W2 304 is used to power the main controller 210. Further, when the converter circuit 200 is in a low voltage mode (e.g. to power a smart phone) such that the output to the load 206 is a lower voltage (e.g. 5V), the voltage on the transformer T and thus the auxiliary windings W1 302 and W2 304 will be lower and the switch Q1 312 will be closed such that both the energy on W2 304 and the voltage on W1 302 (e.g. W1+W2) is used to power the main controller 210. As a result, the circuit 208A provides the advantage that in the both cases that either the output voltage is in a high voltage mode or in a low voltage mode, Vcc voltage is regulated to around a predetermined voltage Vcc, such as 5V.

In some embodiments, the ratio of turns of the winding W1 302 to the turns of the winding W2 304 is 8 to 6 such that W1 has more turns than W2. Alternatively, other turn ratios are able to be used. For example, the turn ratio is able to be based on the desired high mode voltage output to the load 206, the desired low mode voltage output to the load 206 and the desired voltage Vcc 316 to power the main controller 210. Specifically, the winding turn ratio and/or exact turn quantities are able to be configured such that in high mode the voltage on W2 304 is equal or substantially equal to the desired Vcc 316 and in low mode the voltage on W1 and W2 (W1+W2) is equal or substantially equal to the desired Vcc 316.

In operation, during a high output voltage mode, winding W2 304 is selected and used to make the voltage on the winding W2 304 close to the predetermined voltage Vcc. At the voltage divider provided by the resistors R3 306 and R4 308, the auxiliary controller 314 is able to sense that the voltage is in a high output voltage mode, so the switch Q1 312 is set to an OFF (opened) mode, such that the Vcc (the voltage to control the main controller) is powered by the lower winding W2 304. During a low output voltage mode, the switch Q1 312 is closed such that the winding W1 302 can also be selected, such that the voltage on the windings (W1 302+W2 304) is used to provide the predetermined voltage Vcc. In both scenarios (the low and high output voltage modes), Vcc voltage is regulated to around the predetermined voltage Vcc. Since in a high voltage mode, the switch Q1 312 is Off, Vcc is powered by the lower winding W2, so advantageously no or less power loss at the voltage conversion using the auxiliary circuit in accordance with some embodiments.

Figure 4:
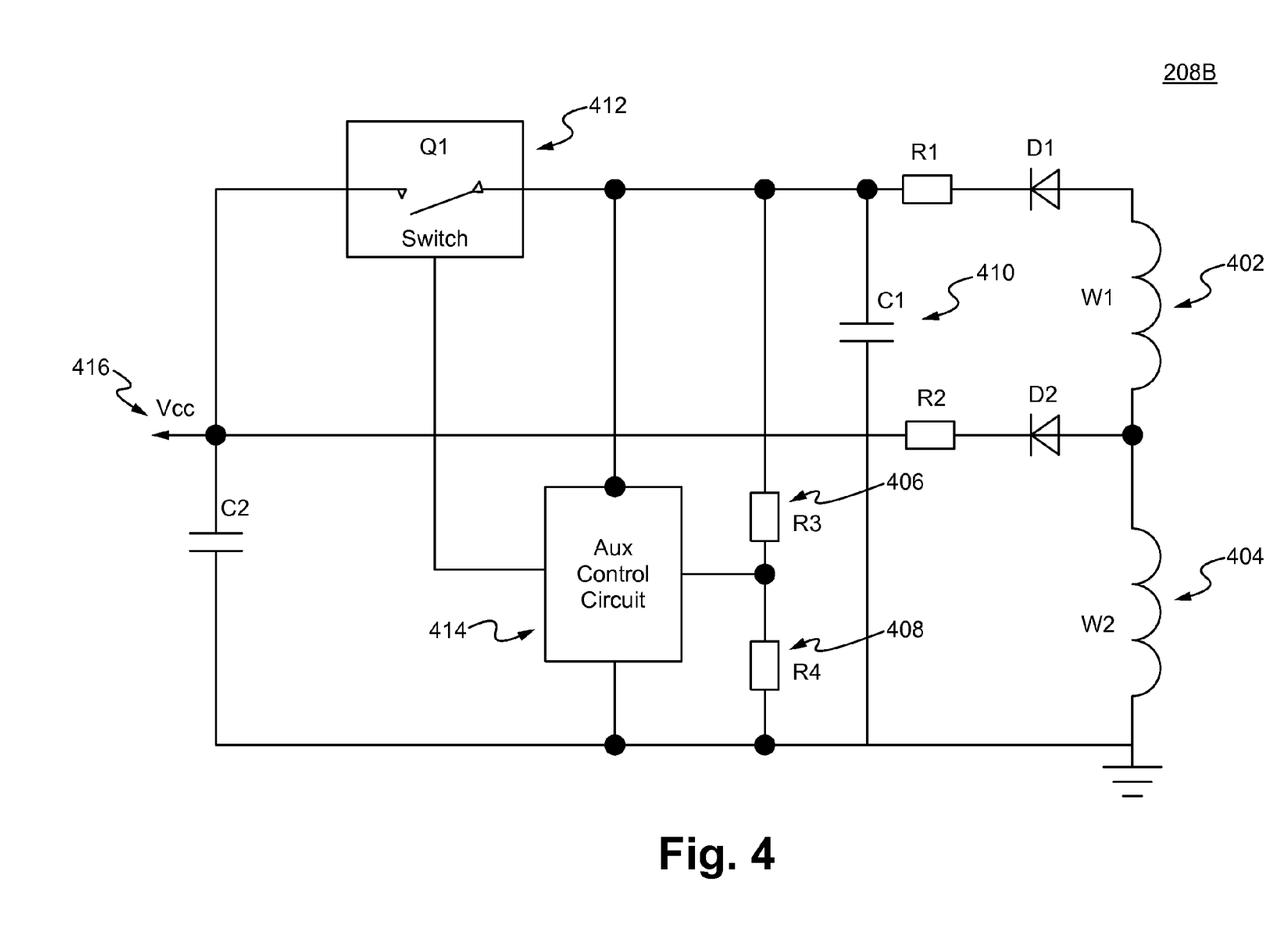
FIG. 4 illustrates a type II switchable auxiliary supply circuits 208B in accordance with some embodiments of the present invention.

FIG. 4 illustrates a type II switchable auxiliary supply circuit 208B in accordance with some embodiments of the present invention. The type II switchable auxiliary supply circuit is able to be substantially similar to the circuit 208A except for the differences described herein. Specifically, as shown in FIG. 4 and described in detail below, instead of sensing voltage from the transformer T and deriving power from a node between the first winding W1 402 and the second winding W2 404, the auxiliary control circuit 414 derives power and senses voltage from the transformer T from a node above the first winding W1 402.

Similar to FIG. 3, the type II switchable auxiliary supply circuit 208B comprises an auxiliary control circuit that is powered by a capacitor C1 410 and voltage sensing member sensing C1 410. The circuit 208B comprises two auxiliary winding W1 402 and W2 404 in a flyback converter. Resistors R3 406 and R4 408 sense the voltage on the capacitor C1 410. When the voltage on C1 is above a predetermined voltage (such as 7V), a switch Q1 412 is OFF (opened), so that the circuit output to a main controller (such as main controller 210 of FIG. 2) is powered by a lower winding W2 404. In the case when the voltage on C1 is below the predetermined voltage, the switch Q1 412 is On (closed), which is controlled by the auxiliary control circuit 414, such that the Vcc 416 to the main controller 210 (FIG. 2) is powered by both windings (W1 402 and W2 404). In the both cases, either the output voltage is in a high voltage mode or in a low voltage mode, Vcc voltage is regulated to substantially a predetermined voltage Vcc, such as 5V.

In a high output voltage mode, the energy on the winding W2 404 is used to provide the predetermined voltage Vcc. The resistors R3 406 and R4 408 sense that the voltage is in a high output voltage mode, so the switch Q1 412 is set on Off (opened) mode, such that the Vcc (the voltage to control the main controller) is powered by the lower winding W2 404.

In a low output voltage mode, the winding W1 402 can be selected, such that the voltage on the winding (W1 402+W2 404) is closer to the predetermined voltage Vcc. In both cases (the low and high output voltage modes), Vcc voltage is regulated to substantially the predetermined voltage Vcc. Since in a high voltage mode, the switch Q1 412 is Off, Vcc is powered by the lower winding W2, with no or less power loss at the voltage conversion.

Figure 5:
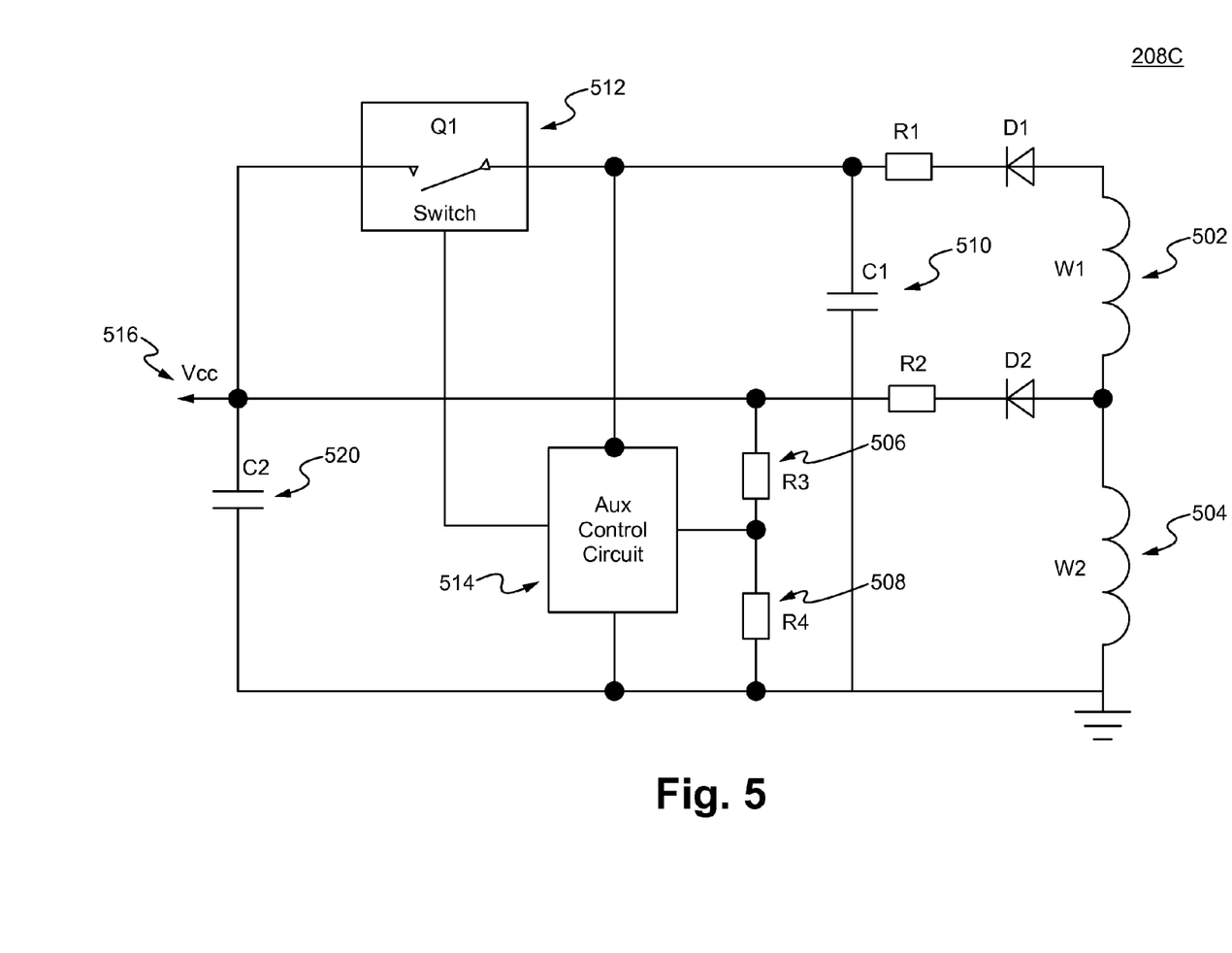
FIG. 5 illustrates a type III switchable auxiliary supply circuits 208C in accordance with some embodiments of the present invention.

FIG. 5 illustrates a type III switchable auxiliary supply circuits 208C in accordance with some embodiments of the present invention. The type III switchable auxiliary supply circuit is able to be substantially similar to the circuit 208A except for the differences described herein. Specifically, as shown in FIG. 5 and described in detail below, instead of deriving power from a node between the first winding W1 502 and the second winding W2 504, the auxiliary control circuit 514 derives power from a node above the first winding W1 502.

Similar to FIG. 3, the type III switchable auxiliary supply circuit 208C comprises an auxiliary control circuit that is powered by a capacitor C1 510 and voltage sensing mechanism on C2 520. The circuit 208C comprises two auxiliary winding W1 502 and W2 504 in a flyback converter. Resistors R3 506 and R4 508 sense the voltage on the capacitor C2 520. When the voltage on C2 is above a predetermined voltage (such as 5V-10V), a switch Q1 512 is OFF (opened), so that the circuit output to a main controller (such as main controller 210 of FIG. 2) is powered by a lower winding W2 504. In the case when the voltage on C2 520 is below the predetermined voltage, the switch Q1 512 is On (closed), which is controlled by the auxiliary control circuit 514, such that the Vcc 516 to the main controller 210 (FIG. 2) is powered by both windings (W1 502 and W2 504). In the cases that either the output voltage is in a high voltage mode or in a low voltage mode, Vcc voltage is regulated to substantially a predetermined voltage Vcc, such as 5V.

In a high output voltage mode, winding W2 504 is selected and used to provide the predetermined voltage Vcc. The resistors R3 506 and R4 508 senses that the voltage is in a high output voltage mode, so the switch Q1 512 is set on Off (opened) mode, such that the Vcc (the voltage to control the main controller) is powered by the lower winding W2 504.

During a low output voltage mode, the winding W1 502 can be selected, such that the voltage on the winding (W1 502+W2 504) provides the predetermined voltage Vcc.

Figure 6:
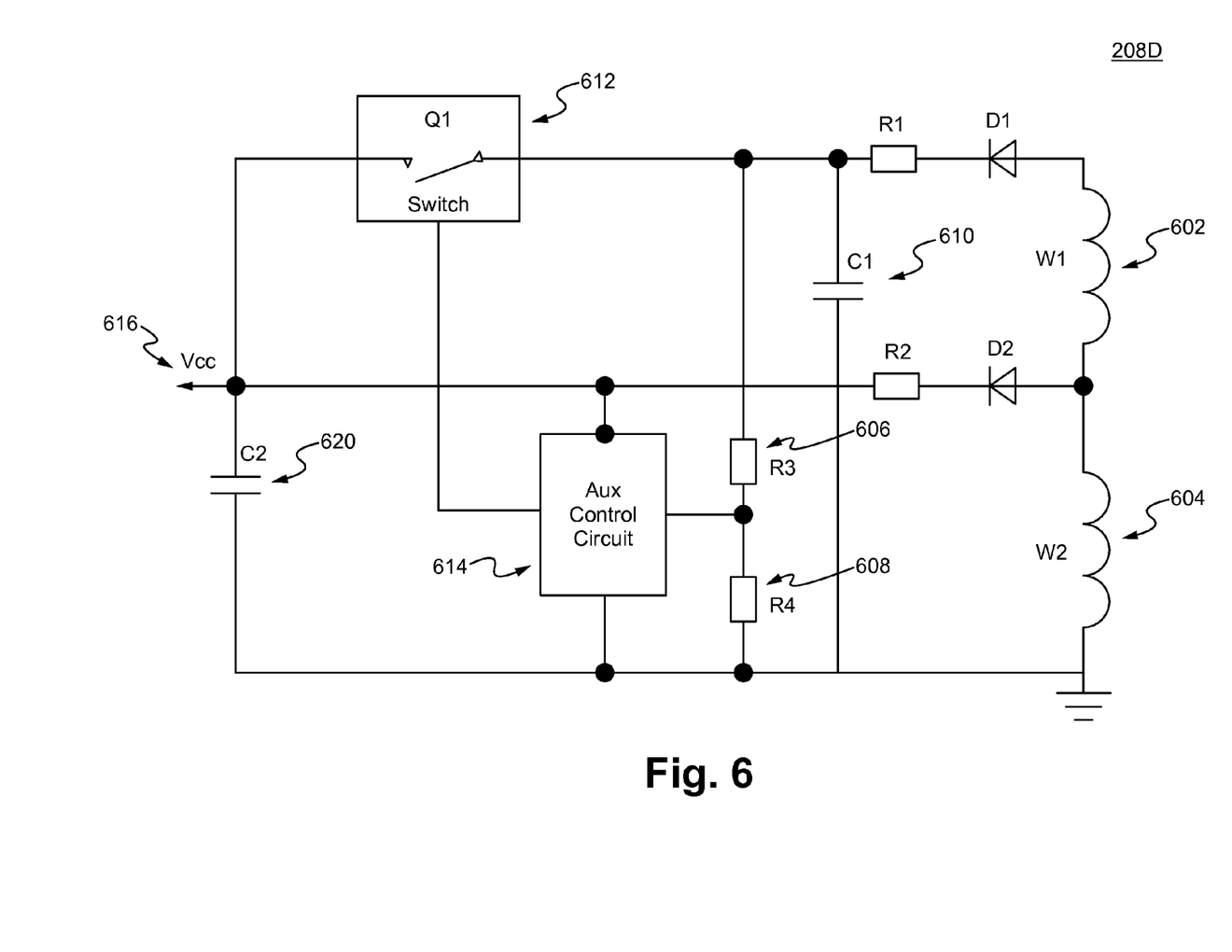
FIG. 6 illustrates a type IV switchable auxiliary supply circuits 208D in accordance with some embodiments of the present invention.

FIG. 6 illustrates a type IV switchable auxiliary supply circuits 208D in accordance with some embodiments of the present invention. The type IV switchable auxiliary supply circuit is able to be substantially similar to the circuit 208A except for the differences described herein. Specifically, as shown in FIG. 6 and described in detail below, instead of sensing voltage from the transformer T from a node between the first winding W1 602 and the second winding W2 604, the auxiliary control circuit 614 senses voltage from the transformer T from a node above the first winding W1 602.

Similar to FIG. 3, the type IV switchable auxiliary supply circuit 208D comprises an auxiliary control circuit that is powered by a capacitor C2 620 and voltage sensing device sensing C1 610. The circuit 208D comprises two auxiliary winding W1 602 and W2 604 in a flyback converter. Resistors R3 606 and R4 608 sense the voltage on the capacitor C1 610. When the voltage on C1 610 is above a predetermined voltage (such as 5V), a switch Q1 612 is OFF (opened), so that the circuit output to a main controller (such as main controller 210 of FIG. 2) is powered by a lower winding W2 604. In the case when the voltage on C1 610 is below the predetermined voltage, the switch Q1 612 is On (closed), which is controlled by the auxiliary control circuit 614, such that the Vcc 616 to the main controller 210 (FIG. 2) is powered by both windings (W1 602 and W2 604). In the cases that either the output voltage is in a high voltage mode or in a low voltage mode, Vcc voltage is regulated to substantially a predetermined voltage Vcc, such as 5V.

In operation during a high output voltage mode, winding W2 604 is selected and used to make the voltage on the winding W2 604 close to the predetermined voltage Vcc. The resistors R3 606 and R4 608 sense that the voltage is in a high output voltage mode, so the switch Q1 612 is set on Off (opened) mode, such that the Vcc (the voltage to control the main controller) is powered by the lower winding W2 604.

In a low output voltage mode, the winding W1 602 can be selected, such that the voltage on the winding (W1 602+W2 604) is close to the predetermined voltage Vcc. In both scenarios (the low and high output voltage modes), Vcc voltage is regulated to substantially the predetermined voltage Vcc.

Figure 7:
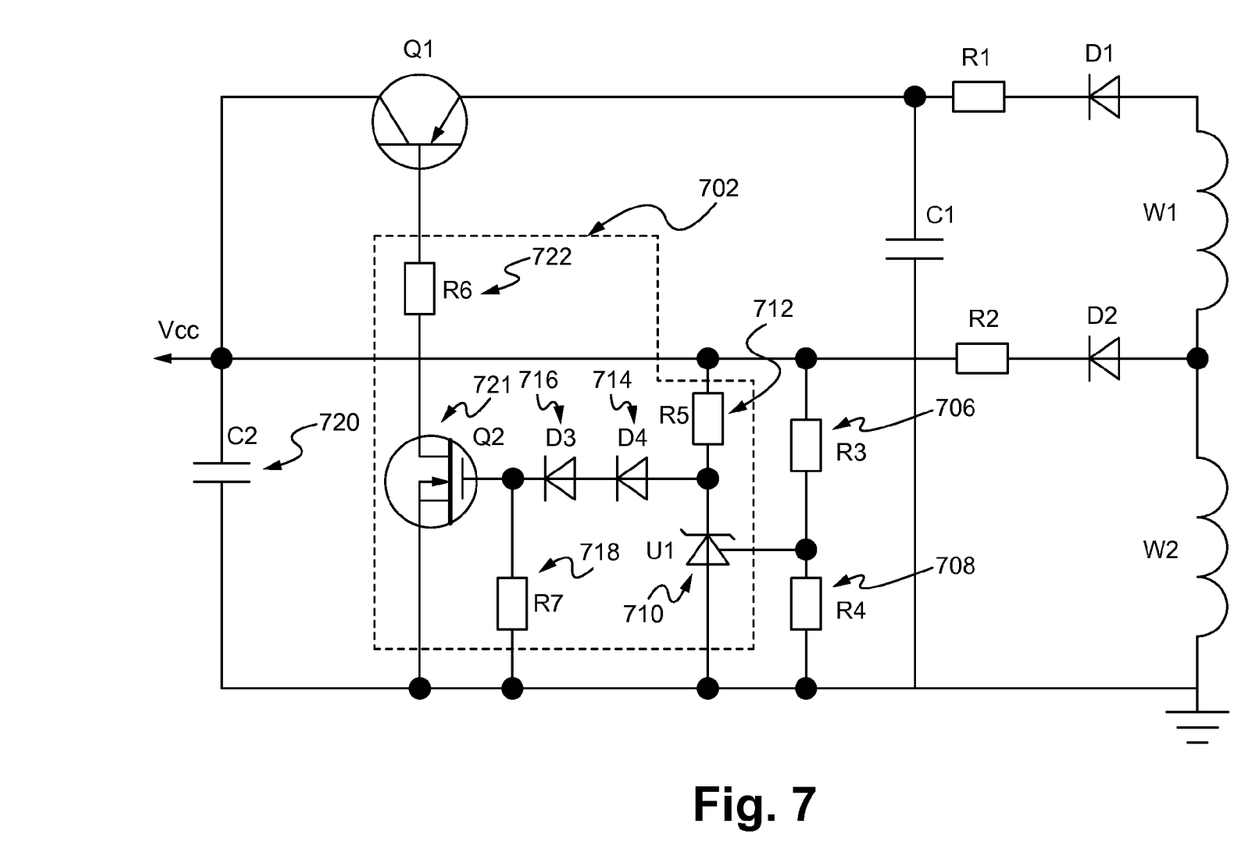
FIG. 7 illustrates a circuit layout 702 of the auxiliary controller circuit 314 (FIG. 3) in accordance with some embodiments of the present invention.

FIG. 7 illustrates a circuit layout 702 of the auxiliary controller circuit 314 (FIG. 3) in accordance with some embodiments of the present invention. The auxiliary controller circuit 314 is part of the type I switchable auxiliary supply circuit 208A, which can be part of the voltage converter 200 of FIG. 2. As shown in the FIG. 7, the auxiliary controller circuit 702 of the type I switchable auxiliary supply circuit is powered by the capacitor C2 720 and voltage detection is done by the resistors R3 706 and R4 708 that are associated with one or more switches.

The auxiliary controller circuit 702 can comprise a three-terminal adjustable shunt regulator 710 electrically coupled with the resistors R3 706 and R4 708. The three-terminal adjustable shunt regulator 710 can also couple with the resistor R5 712, diodes D4 714 and D3 716, resistors R7 718, R6 722, and switch Q2 721.

Figure 8:
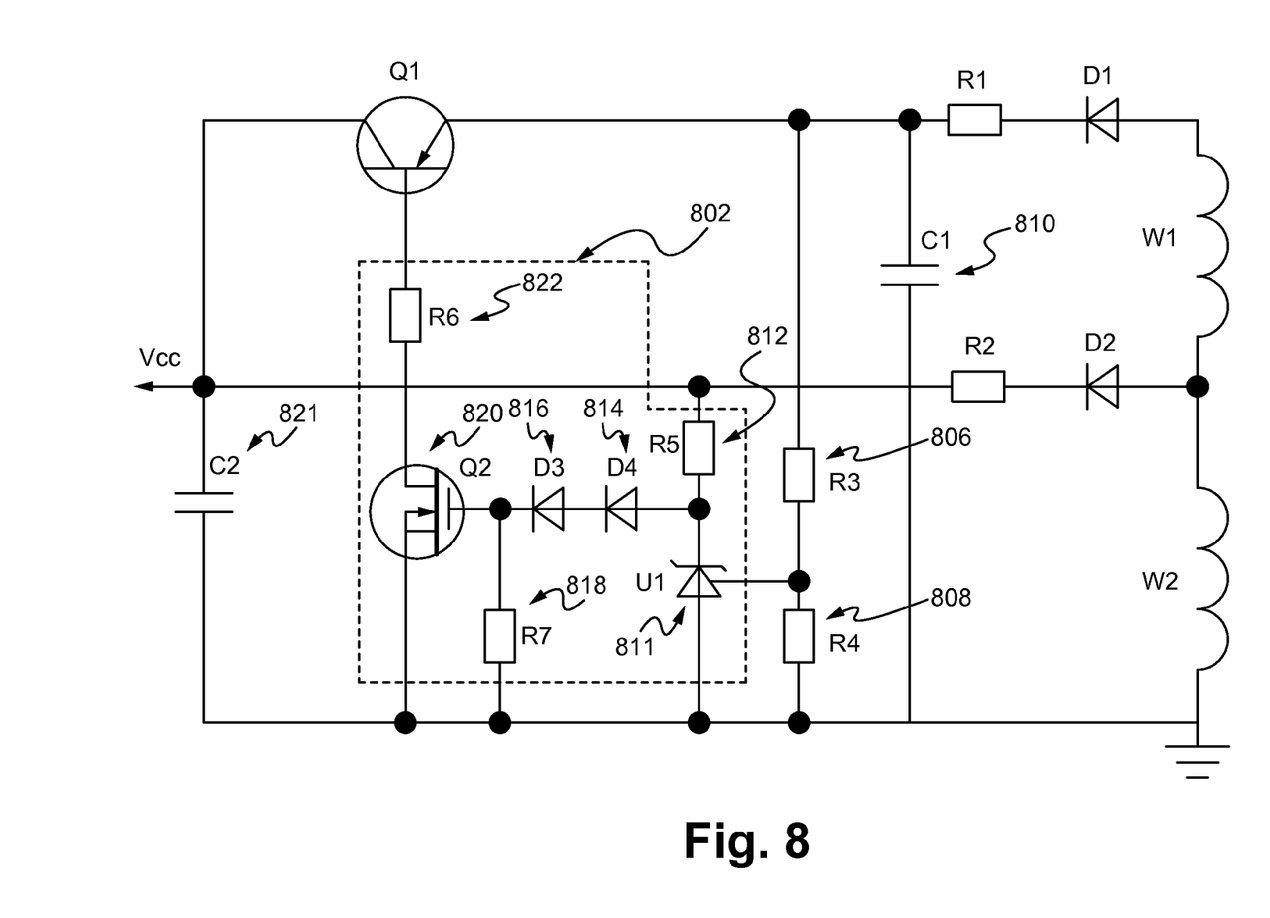
FIG. 8 illustrates a circuit layout 802 of the auxiliary controller circuit 614 (FIG. 6) in accordance with some embodiments of the present invention.

FIG. 8 illustrates a circuit layout 802 of the auxiliary controller circuit 614 (FIG. 6) in accordance with some embodiments of the present invention. The auxiliary controller circuit 614 is part of the type IV switchable auxiliary supply circuit 208D, which can be part of the voltage converter 200 of FIG. 2. As shown in the FIG. 8, the auxiliary controller circuit 802 of the type IV switchable auxiliary supply circuit is powered by the capacitor C2 821 and voltage detection is done by the resistors R3 806 and R4 808 associated with one or more switches.

The auxiliary controller circuit 802 can comprise a three-terminal adjustable shunt regulator 811 electrically couples with the resistors R3 806 and R4 808. The three-terminal adjustable shunt regulator 811 can also couple with the resistor R5 812, diodes D4 814 and D3 816, resistor R7 818, and switch Q2 820, which couples with R6 822. A person of ordinary skill in the art appreciates that other types of switchable auxiliary supply circuits (such as type II and type III described above) can have the same or similar circuit layout as described above.

Figure 9:
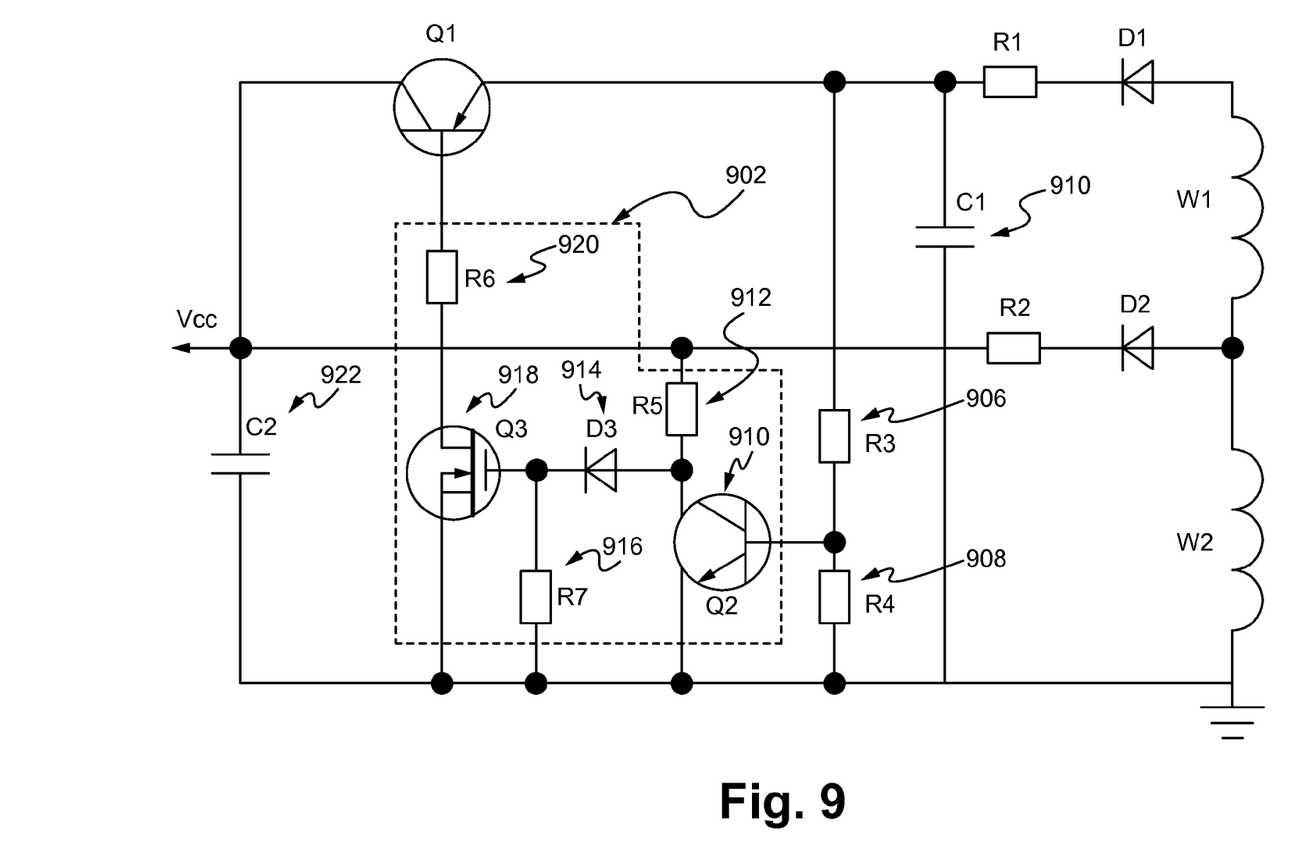
FIG. 9 illustrates a circuit layout 902 of the auxiliary controller circuit 314 (FIG. 3) in accordance with some embodiments of the present invention.

FIG. 9 illustrates a circuit layout 902 of the auxiliary controller circuit 314 (FIG. 3) in accordance with some embodiments of the present invention. The auxiliary controller circuit 314 is part of the type I switchable auxiliary supply circuit 208A, which can be part of the voltage converter 200 of FIG. 2. As shown in the FIG. 9, the auxiliary controller circuit 902 of the type I switchable auxiliary supply circuit is powered by the capacitor C2 922 and voltage detection is done by the resistors R3 906 and R4 908 that associated with one or more switches. The auxiliary controller circuit 902 comprises a transistor Q2 910 electrically couples with the resistors R3 906 and R4 908. The switch 910 can also couple with the resistor R5 912, diodes D3 914, resistors R7 916, and a switch Q3 918. The switch Q3 918 can couple with the resistor R6 920.

Figure 10:
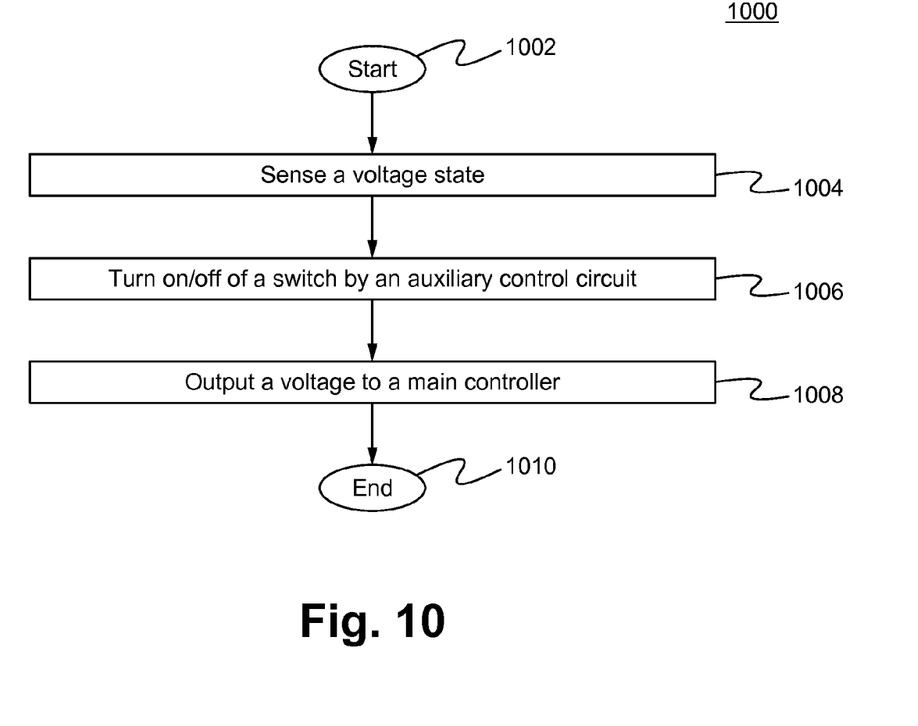
FIG. 10 is a flow chart illustrating a method 1000 of controlling an output voltage of an auxiliary supply circuit.

FIG. 10 is a flow chart illustrating a method 1000 of controlling an output voltage of a converter. The method 1000 can start from Step 1002. At Step 1004, a voltage state on a main power circuit, on an auxiliary circuit, or both are senses. The voltage state can be either in a high mode or in a low mode. At Step 1006, a switch on the auxiliary circuit is turned on or off based on the voltage state. At Step 1008, a voltage (such as Vcc) is outputted to a main controller. The method 1000 can stop at Step 1010. In some embodiments, the switches disclosed herein can be one or more transistors.

The voltage conversion circuits can be utilized to have a steady voltage supply with minimum power loss whether the voltage input is in a high mode or in a low mode.

In operation, an incoming voltage state is determined. The voltage state is used to control the opening or closing of a switch, which in turn decides the portions of the auxiliary circuits used.

The present invention has been described in terms of specific embodiments incorporating details to facilitate the understanding of principles of construction and operation of the invention. Such reference herein to specific embodiments and details thereof is not intended to limit the scope of the claims appended hereto. It is readily apparent to one skilled in the art that other various modifications can be made in the embodiment chosen for illustration without departing from the spirit and scope of the invention as defined by the claims.

What is claimed is:
1. An electrical converter comprising:
  a main power circuit including a first winding circuit and a second winding circuit;
  a switchable auxiliary circuit comprising a switch, the first winding circuit of the main power circuit, the second winding circuit of the main power circuit, and an auxiliary control circuit that controls the switch based on the total amount of voltage on both winding circuits of the main power circuit by either closing the switch to allow voltage from the first winding circuit to pass through or opening the switch to prevent the voltage from the first winding circuit from passing through; and a main controller separate and distinct from but electrically coupled with the switchable auxiliary circuit to power the main controller, wherein the main controller is powered by both winding circuits when the switch is closed and is powered by only the second winding circuit when the switch is opened.

2. The converter of claim 1, wherein the auxiliary control circuit is powered by a capacitor on the first winding circuit and the switchable auxiliary circuit comprises a voltage mode determining mechanism coupled in series with the capacitor on the first winding circuit.

3. The converter of claim 1, wherein the auxiliary control circuit is powered by a capacitor on the second winding circuit and the switchable auxiliary circuit comprises a voltage mode determining mechanism coupled in series with the capacitor on the second winding circuit.

4. The converter of claim 1, wherein the auxiliary control circuit is powered by a capacitor on the second winding circuit and the switchable auxiliary circuit comprises a voltage mode determining mechanism coupled in series with the capacitor on the first winding circuit.

5. The converter of claim 1, wherein the auxiliary control circuit is powered by a capacitor on the first winding circuit and the switchable auxiliary circuit comprises a voltage mode determining mechanism coupled in series with the capacitor on the second winding circuit.

6. The converter of claim 1, wherein the auxiliary control circuit comprises a voltage mode determining mechanism having at least two resistors.

7. An auxiliary circuit configured to power a main controller that is electrically coupled with the auxiliary circuit, the auxiliary circuit comprising:
a first winding circuit;
a second winding circuit;
a switch; and
an auxiliary control circuit that controls the switch based on the total amount of voltage on both winding circuits by either closing the switch to allow voltage from the first winding circuit to pass through such that a Vcc to the main controller is powered by both winding circuit, or opening the switch to prevent the voltage from the first winding circuit from passing through such that the Vcc to the main controller is powered by only the second winding circuit.

8. The circuit of claim 7, wherein first and second winding circuits are of a transformer of a main power circuit that is electrically coupled with the auxiliary circuit.

9. The circuit of claim 8, wherein the main controller is separate and distinct from the auxiliary control circuit.

10. The circuit of claim 8, wherein the auxiliary control circuit is powered by a capacitor on the first winding circuit and wherein the voltage state is determined by a voltage mode determining mechanism coupled in series with the capacitor on the first winding circuit.

11. The circuit of claim 8, wherein the auxiliary control circuit is powered by a capacitor on the second winding circuit and wherein the voltage state is determined by a voltage mode determining mechanism coupled in series with the capacitor on the second winding circuit.

12. The circuit of claim 8, wherein the auxiliary control circuit is powered by a capacitor on the first winding circuit and wherein the voltage state is determined by a voltage mode determining mechanism coupled in series with the capacitor on the second winding circuit.

13. The circuit of claim 8, wherein the auxiliary control circuit is powered by a capacitor on the second winding circuit and wherein the voltage state is determined by a voltage mode determining mechanism coupled in series with the capacitor on the first winding circuit.

14. The circuit of claim 8, wherein the auxiliary circuit comprises a voltage state determining mechanism.

15. A method of reducing power loss in a voltage conversion circuit comprising:
receiving a source power in a main power circuit, wherein the main power circuit includes a first winding circuit and a second winding circuit;
generating a voltage in a switchable auxiliary circuit via the main power circuit, wherein the switchable auxiliary circuit comprises a switch, the first winding circuit of the main power circuit, and the second winding circuit of the main power circuit;
determining the total amount of voltage on both winding circuits of the main power circuit to thereby control the switch of the switchable auxiliary circuit by either closing the switch to allow voltage from the first winding circuit to pass through such that a Vcc is powered by both winding circuit or opening the switch to prevent the voltage from the first winding circuit from passing through such that the Vcc is powered by only the second winding circuit; and
outputting the Vcc from the switchable auxiliary circuit to a main controller.

16. The method of claim 15, wherein the switchable auxiliary circuit comprises an auxiliary control circuit coupling with the switch.

17. The method of claim 15, wherein both winding circuits are primary winding circuits.

* * * * *